(12) United States Patent
Parsons (10) Patent No.: US 10,103,391 B2
(45) Date of Patent: Oct. 16, 2018

(54) FUEL CELL SEAL

(75) Inventor: Jason B. Parsons, Manchester, CT (US)

(73) Assignee: AUDI AG, Ingolstadt (DE)

( * ) Notice: Subject to any disclaimer, the term of this patent is extended or adjusted under 35 U.S.C. 154(b) by 682 days.

(21) Appl. No.: 13/981,381

(22) PCT Filed: Jan. 28, 2011

(86) PCT No.: PCT/US2011/022801
§ 371 (c)(1),
(2), (4) Date: Sep. 9, 2013

(87) PCT Pub. No.: WO2012/102724
PCT Pub. Date: Aug. 2, 2012

(65) Prior Publication Data
US 2014/0011114 A1    Jan. 9, 2014

(51) Int. Cl.
*H01M 8/02*    (2016.01)
*H01M 8/0271*    (2016.01)
(Continued)

(52) U.S. Cl.
CPC ....... *H01M 8/0271* (2013.01); *H01M 8/0273* (2013.01); *H01M 8/0276* (2013.01);
(Continued)

(58) Field of Classification Search
None
See application file for complete search history.

(56) References Cited

U.S. PATENT DOCUMENTS 5,173,373 A * 12/1992 Ohsuga ............... H01M 8/0273
429/500
5,464,700 A * 11/1995 Steck ........................ C25B 9/00
429/483
(Continued)

FOREIGN PATENT DOCUMENTS

CN    101032046 A    9/2007
CN    101523647 A    9/2009
(Continued)

OTHER PUBLICATIONS

International Preliminary Report on Patentability for International Application No. PCT/US2011/022801 dated Aug. 8, 2013.
(Continued)

*Primary Examiner* — Ula C Ruddock
*Assistant Examiner* — Amanda J Barrow
(74) *Attorney, Agent, or Firm* — Seed Intellectual Property Law Group LLP (57) ABSTRACT

An example fuel cell seal assembly includes a seal configured to restrict flow of a fuel cell fluid through at least one of an outer lateral edge of a first gas diffusion layer, an outer lateral edge of a membrane electrode assembly, and an outer lateral edge of a second gas diffusion layer. The outer lateral edge of the first gas diffusion layer is laterally spaced from the outer lateral edge of the second gas diffusion layer. An example method of sealing a fuel cell interface includes limiting flow of a fuel cell fluid using a seal configured to restrict flow through an outwardly facing edge of at least one of a first gas diffusion layer and an outwardly facing edge of a second gas diffusion layer. The outwardly facing edge of the first gas diffusion layer is spaced from the outwardly facing edge of the second gas diffusion layer.

15 Claims, 4 Drawing Sheets

(51) Int. Cl.
*H01M 8/0273* (2016.01)
*H01M 8/1004* (2016.01)
*H01M 8/0276* (2016.01)
*H01M 8/0297* (2016.01)
*H01M 8/1018* (2016.01)

(52) U.S. Cl.
CPC ....... *H01M 8/0297* (2013.01); *H01M 8/1004* (2013.01); *H01M 2008/1095* (2013.01)

(56) References Cited

U.S. PATENT DOCUMENTS

| | | |
|---|---|---|
| 5,523,175 A | 6/1996 | Beal et al. |
| 5,795,668 A | 8/1998 | Banerjee |
| 6,020,083 A | 2/2000 | Breault et al. |
| 6,057,054 A * | 5/2000 | Barton ............... H01M 8/0271 29/623.1 |
| 6,423,439 B1 | 7/2002 | Barton et al. |
| 6,485,856 B1 | 11/2002 | Brown et al. |
| 6,613,203 B1 | 9/2003 | Hobson et al. |
| 6,794,079 B2 | 9/2004 | Inagaki et al. |
| 2003/0221311 A1 | 12/2003 | Smith et al. |
| 2004/0043283 A1 | 3/2004 | Cipollini et al. |
| 2004/0191604 A1 | 9/2004 | Artibise et al. |
| 2004/0224216 A1 | 11/2004 | Burlatsky et al. |
| 2005/0014056 A1* | 1/2005 | Zuber ..................... C25B 9/10 429/456 |
| 2005/0089746 A1 | 4/2005 | James et al. |
| 2005/0255372 A1* | 11/2005 | Lertola ............... H01M 4/8605 429/457 |
| 2008/0096090 A1 | 4/2008 | Cipollini et al. |
| 2008/0124458 A1 | 5/2008 | Okabe |
| 2009/0000732 A1 | 1/2009 | Jacobine et al. |
| 2009/0148744 A1* | 6/2009 | Fehervari ............... C08J 5/2243 429/487 |
| 2009/0253014 A1* | 10/2009 | Tanahashi ........... H01M 8/0284 429/434 |
| 2009/0258273 A1* | 10/2009 | Arcella ............... H01M 8/0239 429/434 |
| 2009/0286121 A1* | 11/2009 | Morimoto ........... H01M 8/0273 429/494 |
| 2010/0047649 A1* | 2/2010 | Yamada ............... H01M 8/0273 429/481 |
| 2010/0209811 A1 | 8/2010 | Barnwell et al. |
| 2010/0248087 A1* | 9/2010 | Tsuji .................. B29C 45/1671 429/535 |

FOREIGN PATENT DOCUMENTS

| | | |
|---|---|---|
| EP | 2 048 730 A1 | 4/2009 |
| JP | 7-501417 A | 2/1995 |
| JP | 2004-47230 A | 2/2004 |
| JP | 2004039385 | 2/2004 |
| JP | 2007066766 | 3/2007 |
| JP | 2008041337 | 2/2008 |
| JP | 2009-252479 A | 10/2009 |
| KR | 10-0876262 B1 | 12/2008 |
| KR | 10-2009-0074154 A | 7/2009 |
| WO | 2004/102721 A2 | 11/2004 |
| WO | 2008/001755 A1 | 1/2008 |
| WO | 2009/072291 A1 | 6/2009 |
| WO | WO 2009/072291 * | 11/2009 .............. H01M 8/02 |

OTHER PUBLICATIONS

International Search Report and Written Opinion for PCT/US2011/022801 dated Oct. 10, 2011.
Extended European Search Report, dated Jun. 22, 2016, for European Application No. 11857329.4—1373 / 2668689, 6 pages.
Supplementary European Search Report, dated Apr. 24, 2008, for European Application No. 04815997.4—1227 / 1227, 2 pages.

* cited by examiner

FUEL CELL SEAL

STATEMENT REGARDING FEDERALLY SPONSORED RESEARCH

The embodiments of this disclosure were made with government support under Contract No. DE-FG36-07GO17005 awarded by the United States Department of Energy. Therefore, the United States Government may have certain rights in this invention.

CROSS-REFERENCE TO RELATED APPLICATIONS

This application is the U.S. national phase of PCT/US2011/022801, filed Jan. 28, 2011.

TECHNICAL FIELD

This disclosure relates generally to fuel cells. More particularly, this disclosure relates to a sealing arrangement for a fuel cell.

DESCRIPTION OF RELATED ART

Fuel cell stack assemblies are well known and typically include multiple individual fuel cells. The individual fuel cells may each include a polymer electrolyte membrane (PEM) positioned between porous carbon electrode layers. One of the electrode layers operates as an anode. The other electrode layer operates as a cathode. The PEM and the porous carbon electrode layers together establish a membrane electrode assembly (MEA) or a catalyst coated membrane. Gas diffusion layers (GDLs) are located adjacent opposing sides of the MEA. The GDLs distribute fuel cell fluids, such as hydrogen and air, to the MEA.

A seal at the lateral perimeters of the GDLs and the MEA prevents reactants from mixing in the GDLs and leaking into their opposite manifolds, for example. The seals are typically injection molded.

SUMMARY

An example fuel cell seal assembly includes a seal that is configured to restrict flow of a fuel cell fluid through at least one of an outer lateral edge of a first gas diffusion layer, an outer lateral edge of a membrane electrode assembly, and an outer lateral edge of a second gas diffusion layer. The outer lateral edge of the first gas diffusion layer is laterally spaced from the outer lateral edge of the second gas diffusion layer.

An example fuel cell stack arrangement includes a membrane electrode assembly, a first gas diffusion layer positioned against a side of the membrane electrode assembly, and a second gas diffusion layer positioned against an opposing side of the membrane electrode assembly. A seal is configured to restrict flow through the lateral outer edge of the first gas diffusion layer, the lateral outer edge of the second gas diffusion layer, or both. A lateral outer edge portion of the first gas diffusion layer extends lateral further than a lateral outer edge portion of the second gas diffusion layer.

An example method of sealing a fuel cell interface includes limiting flow of a fuel cell fluid using a seal configured to restrict flow through an outwardly facing edge of at least one of a first gas diffusion layer and an outwardly facing edge of a second gas diffusion layer. The outwardly facing edge of the first gas diffusion layer is spaced from the outwardly facing edge of the second gas diffusion layer.

These and other features of the disclosed examples can be best understood from the following specification and drawings. The following is a brief description of the drawings.

DETAILED DESCRIPTION

Figure 1:
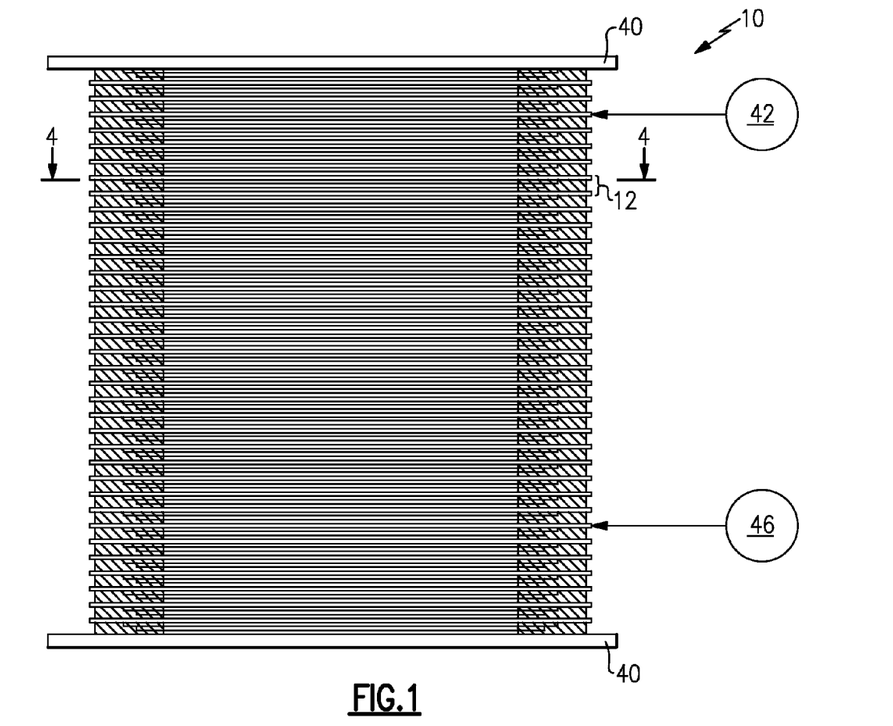
FIG. 1 shows a schematic view an example fuel cell stack assembly having selected portions of a seal assembly removed.
Figure 2:
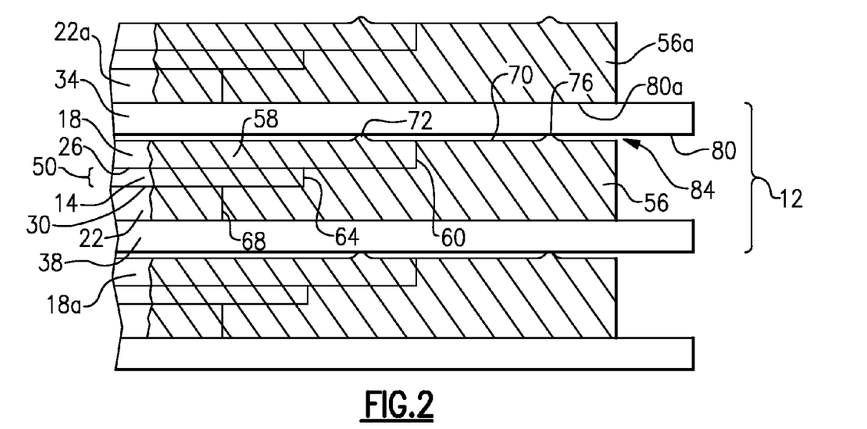
FIG. 2 shows a close-up view of a lateral outer portion of the FIG. 1 assembly.

Referring to FIGS. 1 and 2, an example fuel cell stack assembly 10 includes a multiple of a fuel cell 12. The example fuel cell 12 includes a polymer electrolyte membrane (PEM) 14 positioned between a first gas diffusion layer (GDL) 18 and a second gas diffusion layer (GDL) 22. A surface of the PEM 14 facing the first GDL 18 is coated with an anode electrode 26. An opposing surface of the PEM 14 faces the second GDL 22 and is coated with a cathode electrode 30.

A plate 34 is positioned against the first GDL 18. The plate 34 establishes channels (not shown) configured to deliver a fuel, such as hydrogen, from a fuel supply 42 to the first GDL 18. The fuel moves through the first GDL 18 to the anode electrode 26.

Another plate 38 is positioned against the second GDL 22. The plate 38 establishes channels (not shown) configured to deliver an oxidant, such as oxygen, from an oxidant supply 46 to the second GDL 22. The oxidant moves through the second GDL 22 to the cathode electrode 30.

The plate 34 establishes additional channels configured to deliver oxidant to another GDL 22a within the fuel cell stack assembly 10. Similarly, the plate 38 establishes additional channels configured to deliver fuel to a GDL 18a within the fuel cell stack assembly 10.

Pressure plates 40 clamp the fuel cell 12 within the stack. Bolts (not shown) are used in one example to facilitate applying the clamping force to the fuel cell 12 with the pressure plates 40.

In this example, the anode electrode 26, the PEM 14, and the cathode electrode 30 together form a membrane electrode assembly (MEA) 50 that provides electrical energy in a known manner when supplied with hydrogen and oxygen. Byproducts, such as water and heat, are generated as the hydrogen ions and oxygen combine proximate the cathode electrode 30.

The example fuel cell 12 includes a seal assembly 56 mounted about the peripheral portions of the first GDL 18, the MEA 50, and the second GDL 22. The example seal assembly 56 is configured to restrict flow of fuel cell fluid through at least a first outer lateral edge 60 of the first GDL 18, a second outer lateral edge 64 of the MEA 50, and a third outer lateral edge 68 of the second GDL 22. Example fuel cell fluids having flow restricted by the seal assembly 56 include the hydrogen and oxygen supplied to the fuel cell stack assembly 10.

The example seal assembly 56 includes an impregnated portion 58, which corresponds to a portion of the seal assembly 56 impregnated within the first GDL 18, the PEM 14, or the second GDL 22. The example seal assembly 56 is uniform piece. That is, the example seal is formed as a single piece of material.

An upper surface 70 of the example seal assembly 56 includes an inner seal bead 72 and an outer seal bead 76. The inner seal bead 72 and outer seal bead 76 contact a downwardly facing surface 80 of the plate 34 to block flow of fuel cell fluids at an interface 84 between the seal assembly 56 and the plate 34.

In another example, a downwardly facing surface 80a of an adjacent seal assembly 56a includes one or both of the inner seal bead 72 and the outer seal bead 76. Other examples do not include the inner seal bead 72 or the outer seal bead 76.

Figure 3:
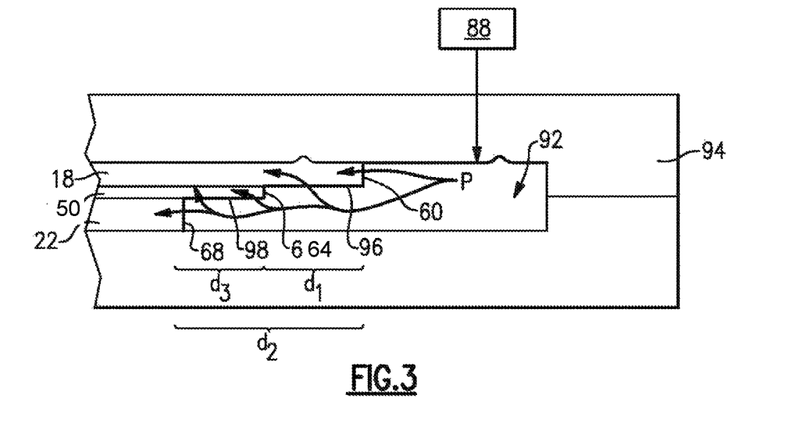
FIG. 3 shows an example mold used to mold a seal assembly of the FIG. 1 assembly.

Referring now to FIG. 3, the example seal assembly 56 is injection molded to the lateral periphery of the first GDL 18, the MEA 50, and the second GDL 22. During the molding process, a molten seal material is injected from a mold supply 88 into a cavity 92 established by a mold 94. The molten material cools and cures within the mold 94. The mold 94 holds the position of the molten seal material during the cooling and curing. The mold 94 is removed after the molten material cools and cures.

In addition to injection molding, other example processes suitable for forming the seal assembly 56 include compression molding and transfer molding.

In this example, the first outer lateral edge 60 of the first GDL 18 is laterally spaced a distance $d_1$ from the second outer lateral edge 64 of the MEA 50, and is laterally spaced a distance $d_2$ from the third outer lateral edge 68 of the second GDL 22. Further, the third outer lateral edge 68 of the second GDL 22 is laterally spaced at distance $d_3$ from the second outer lateral edge 64 of the MEA 50.

In this example, the lateral spacing facilitates forming the impregnated portion 58 because the molten seal material flows against more of the surface area of the first GDL 18 and the PEM 14 during molding than if the first outer lateral edge 60, the second outer lateral edge 64, and the third outer lateral edge 68 were each laterally aligned. That is, when laterally spaced, the molten material is able to move through a lower surface portion 96 of the first GDL 18 and a lower surface portion 98 of the PEM 14 along path P to form the impregnated portion 58, in addition to moving through the first outer lateral edge 60, the second outer lateral edge 64, and the third outer lateral edge 68.

The first outer lateral edge 60, the second outer lateral edge 64, and the third outer lateral edge 68 are aligned parallel to each other in this example. In other example, one or more of the first outer lateral edge 60, the second outer lateral edge 64, and the third outer lateral edge 68 are positioned transverse to each other.

In one example, the a portion of the first GDL 18 and the second GDL 22 inboard the seal assembly 56 are compressed to reduce flash resulting from the molding.

The example seal assembly 56 comprises a nonsilicone seal material, such as EPDM rubber or FKM rubber.

Figure 4:
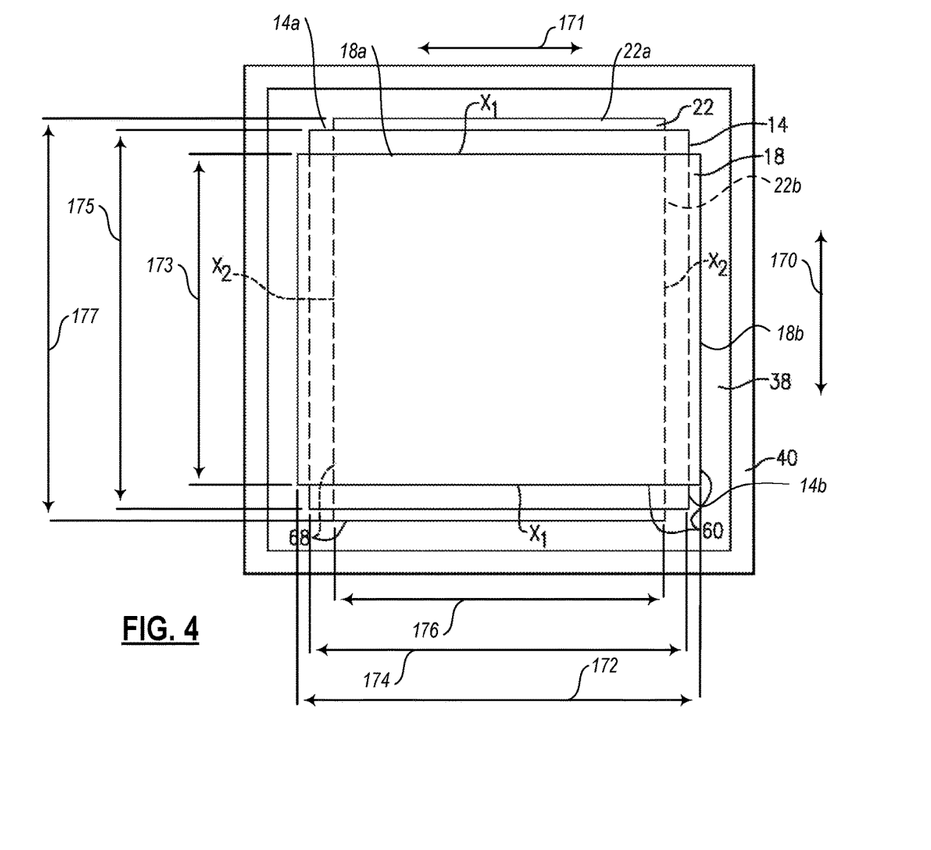
FIG. 4 shows a section view at line 4-4 of FIG. 1.

Referring now to FIG. 4 with continuing reference to FIG. 1, the example seal assembly 56 (FIG. 2) has a picture frame type configuration having a longitudinal direction 170 and a lateral direction 171 that is transverse to the longitudinal direction 170. The first GDL 18 and the second GDL 22 are rectangular and have opposing sides longer than their other opposing sides. More particularly, the first GDL 18 has opposing lateral sides 18a longer than opposing longitudinal sides 18b and the second GDL 22 has opposing longitudinal sides 22b longer than opposing lateral sides 22a. The PEM 14 is square and thus has opposing longitudinal sides 14b that are the same length as the opposing lateral sides 14a of the PEM 14. As such, the first GDL 18 has a lateral width 172 in the lateral direction 171 and a longitudinal width 173 in the longitudinal direction 170. Similarly, the PEM 14 has a lateral width 174 in the lateral direction 171 and a longitudinal width 175 in the longitudinal direction 170, and the second GDL 22 has a lateral width 176 in the lateral direction 171 and a longitudinal width 177 in the longitudinal direction 170. As illustrated in FIG. 4, the longitudinal width 177 of the second GDL 22 is greater than the longitudinal width 175 of the PEM 14, and the longitudinal width 175 of the PEM 14 is greater than the longitudinal with 173 of the first GDL 18. In addition, the lateral width 172 of the first GDL 18 is greater than the lateral width 174 of the PEM 14, and the lateral width 174 of the PEM 14 is greater than the lateral width 176 of the second GDL 22. The sides of the first GDL 18, the PEM 14 and the second GDL 22 are also referred to herein as lateral edges 60.

When arranged within the fuel cell stack 112, the longer sides $X_1$ of the first GDL 18 are arranged perpendicularly to the longer sides $X_2$ of the second GDL 22. Thus, as can be appreciated, the first outer lateral edge 60 of the first GDL 18 extends laterally further than the third outer lateral edge 68 of the second GDL 22 on two outboard sides of the fuel cell 12. Similarly, the third outer lateral edge 68 of the second GDL 22 extends laterally further than the first outer lateral edges 60 of the first GDL 18 on the other two outboard sides of the fuel cell 12.

Figure 5:
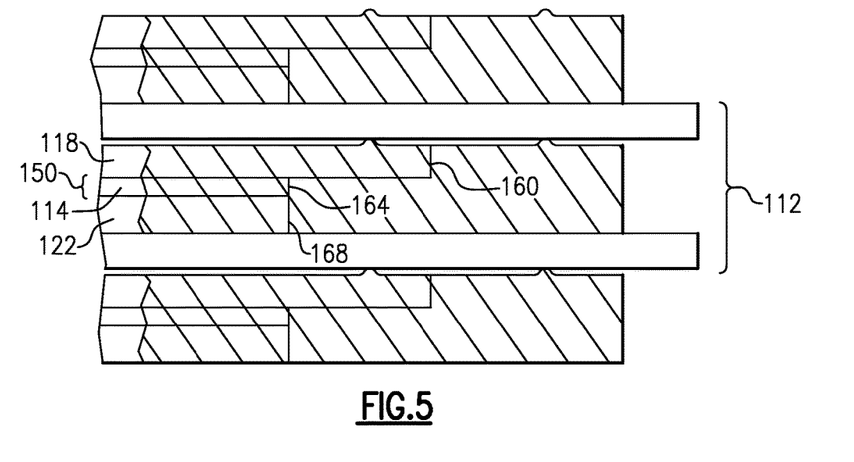
FIG. 5 shows a close-up view of a lateral outer portion of another example fuel cell.

Referring to FIG. 5, another example fuel cell 112 includes an MEA 150 having a second outer lateral edge 164 that is coextensive with a third outer lateral edge 168 of a second GDL 122. A first GDL positioned has a first outer lateral edge 160 extending laterally beyond the second outer lateral edge 164 and the third outer lateral edge 168.

Figure 6:
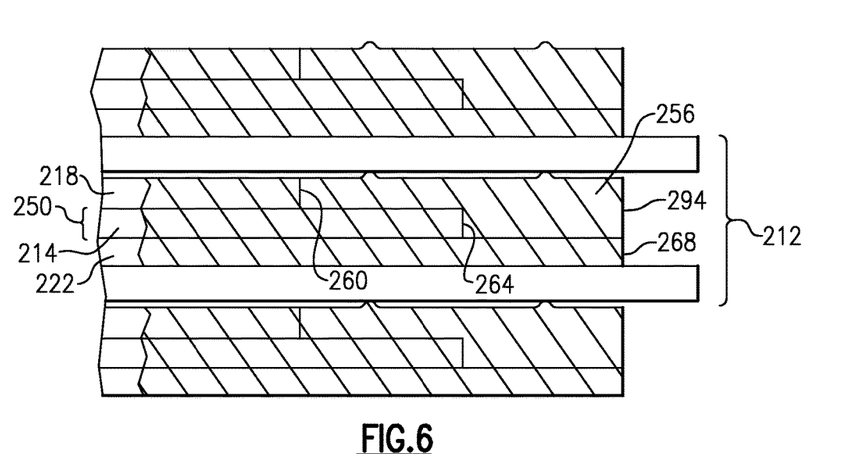
FIG. 6 shows a close-up view of a lateral outer portion of yet another example fuel cell.

Referring to FIG. 6, another example fuel cell 212 includes a first outer lateral edge 260 of a first GDL 218 laterally spaced from a second outer lateral edge 264 of a an MEA 250 and a third outer lateral edge 268 of a second GDL 222. In this example, the third outer lateral edge 268 of the second GDL 222 is coextensive with an outer lateral edge 299 of a seal assembly 256.

Figure 7:
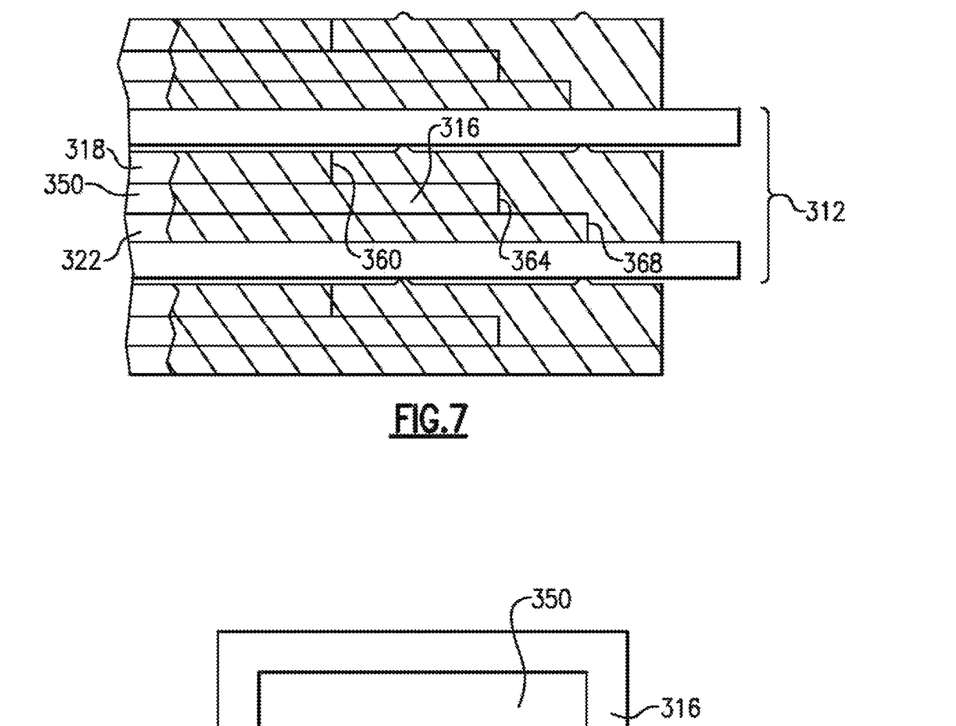
FIG. 7 shows a close-up view of a lateral outer portion of another example fuel cell that uses a frame.
Figure 8:
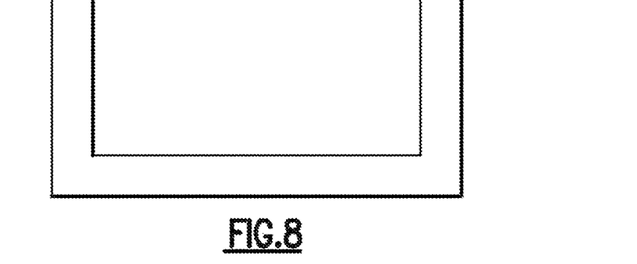
FIG. 8 shows the FIG. 7 frame and MEA.

Referring to FIGS. 7 and 8, another example fuel cell 312 includes a frame 316 around the periphery of an MEA 350. In this example, a first outer lateral edge 360 of a first GDL 318 extends laterally past the MEA 350 to the frame 316. A third outer lateral edge 368 of a second GDL 322 extends past a second outer lateral edge 364 of the frame 316. The frame 316 is a polyethylene naphthalate material in one example.

Although the example fuel cell stack assemblies are PEM-based, a person skilled in art and having the benefit of this disclosure would understand other types of fuel cells that would benefit from the teachings of this disclosure.

Features of the disclosed examples include improved flow of the molten seal material during the molding process and formation of the impregnated portion of the seal assembly. In one example, the mold utilizes a reduced number of seal channels due to the improved flow of the molten seal material. Another feature includes a more compliant seal bead because the seal assembly, particularly the outermost portions of the seal assembly, lacks the resistance of two gas diffusion layers.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A fuel cell seal assembly, comprising:
a seal that is configured to restrict flow of a fuel cell fluid through:
a first outer lateral edge of a first gas diffusion layer and a second outer lateral edge of the first gas diffusion layer which is opposite the first outer lateral edge of the first gas diffusion layer with respect to a lateral direction, each of the first and second outer lateral edges of the first gas diffusion layer extending between a first surface of the first gas diffusion layer and a second surface of the first gas diffusion layer opposite the first surface and defining a lateral width of the first gas diffusion layer;
a first outer lateral edge of a membrane electrode assembly and a second outer lateral edge of the membrane electrode assembly which is opposite the first outer lateral edge of the membrane electrode assembly with respect to the lateral direction, each of the first and second outer lateral edges of the membrane electrode assembly extending between a first surface of the membrane electrode assembly and a second surface of the membrane electrode assembly opposite the first surface and defining a lateral width of the membrane electrode assembly; and
a first outer lateral edge of a second gas diffusion layer and a second outer lateral edge of the second gas diffusion layer which is opposite the first outer lateral edge of the second gas diffusion layer with respect to the lateral direction, each of the first and second outer lateral edges of the second gas diffusion layer extending between a first surface of the second gas diffusion layer and a second surface of the second gas diffusion layer opposite the first surface and defining a lateral width of the second gas diffusion layer, wherein:
the lateral width of the first gas diffusion layer is greater than the lateral width of the membrane electrode assembly, with the first outer lateral edge of the first gas diffusion layer being offset laterally beyond the first outer lateral edge of the membrane electrode assembly on a first lateral end of the membrane electrode assembly, and with the second outer lateral edge of the first gas diffusion layer being offset laterally beyond the second outer lateral edge of the membrane electrode assembly on a second lateral end of the membrane electrode assembly which is opposite the first lateral end,
the first gas diffusion layer has a longitudinal width in a longitudinal direction which is transverse to the lateral direction, the longitudinal width of the first gas diffusion layer being defined between third and fourth outer lateral edges of the first gas diffusion layer,
the membrane electrode assembly has a longitudinal width in the longitudinal direction which is transverse to the lateral direction, the longitudinal width of the membrane electrode assembly defined between third and fourth outer lateral edges of the membrane electrode assembly,
the longitudinal width of the membrane electrode assembly is greater than the longitudinal width of the first gas diffusion layer, with each of the third and fourth outer lateral edges of the membrane electrode assembly being offset beyond a respective one of the third and fourth outer lateral edges of the first gas diffusion layer in the longitudinal direction,
the lateral width of the membrane electrode assembly is greater than the lateral width of the second gas diffusion layer, with the first outer lateral edge of the membrane electrode assembly on the first lateral end of the membrane electrode assembly being laterally offset beyond the first outer lateral edge of the second gas diffusion layer in the lateral direction, and with the second outer lateral edge of the membrane electrode assembly on the second lateral end of the membrane electrode assembly being laterally offset beyond the second outer lateral edge of the second gas diffusion layer in the lateral direction,
the seal completely covers the first outer lateral edge of the first gas diffusion layer, the first outer lateral edge of the membrane electrode assembly, and the first outer lateral edge of the second gas diffusion layer, and
the seal extends between the first surface of the first gas diffusion layer and the second surface of the second gas diffusion layer, the seal having a first surface which is substantially coplanar with the first surface of the first gas diffusion layer and a second surface which is substantially coplanar with the second surface of the second gas diffusion layer.

2. The fuel cell seal assembly of claim 1, wherein a portion of the seal is impregnated within a portion of at least one of the first gas diffusion layer, the membrane electrode assembly, and the second gas diffusion layer.

3. The fuel cell seal assembly of claim 1, wherein the seal comprises at least one seal bead configured to seal against a fuel cell plate.

4. The fuel cell seal assembly of claim 1, wherein the seal is secured about a periphery of the first gas diffusion layer, the membrane electrode assembly, and the second gas diffusion layer.

5. The fuel cell seal assembly of claim 4, wherein the second gas diffusion layer has a longitudinal width in the longitudinal direction which is transverse to the lateral direction, the longitudinal width of the second gas diffusion layer being defined by third and fourth outer lateral edges of the second gas diffusion layer, with each of the third and fourth outer lateral edges of the second gas diffusion layer being offset beyond a respective one of the third and fourth outer lateral edges of the first gas diffusion layer in the longitudinal direction.

6. The fuel cell seal assembly of claim 1, wherein the seal is an injection molded seal.

7. The fuel cell seal assembly of claim 1, wherein the seal is a uniform piece.

8. The fuel cell seal assembly of claim 1, wherein the first outer lateral edge of the first gas diffusion layer, the first outer lateral edge of the membrane electrode assembly, and the first outer lateral edge of the second gas diffusion layer face outwardly from a same side of the fuel cell seal assembly.

9. A fuel cell stack arrangement, comprising:
a membrane electrode assembly having a first lateral outer edge and a second lateral outer edge which is opposite the first lateral outer edge with respect to a lateral direction, each of the first and second lateral outer edges of the membrane electrode assembly extending between a first surface of the membrane electrode assembly and a second surface of the membrane electrode assembly opposite the first surface and defining a lateral width of the membrane electrode assembly;
a first gas diffusion layer positioned against the first surface of the membrane electrode assembly, the first gas diffusion layer having a first lateral outer edge and a second lateral outer edge which is opposite the first lateral outer edge with respect to the lateral direction, each of the first and second lateral outer edges extending between a first surface of the first gas diffusion layer and a second surface of the first gas diffusion layer opposite the first surface and defining a lateral width of the first gas diffusion layer;
a second gas diffusion layer positioned against the second surface of the membrane electrode assembly, the second gas diffusion layer having a first lateral outer edge and a second lateral outer edge which is opposite the first lateral outer edge of the second gas diffusion layer with respect to the lateral direction, each of the first and second lateral outer edges of the second gas diffusion layer extending between a first surface of the second gas diffusion layer and a second surface of the second gas diffusion layer opposite the first surface and defining a lateral width of the second gas diffusion layer; and
a seal configured to restrict flow through the first lateral outer edge of the first gas diffusion layer, the first lateral outer edge of the second gas diffusion layer, and the first lateral outer edge of the membrane electrode assembly, the seal completely covering the first lateral outer edge of the first gas diffusion layer, the first lateral outer edge of the membrane electrode assembly, and the first lateral outer edge of the second gas diffusion layer, wherein:
the lateral width of the first as diffusion layer is greater than the lateral width of the membrane electrode assembly, with the first lateral outer edge of the first gas diffusion layer being offset laterally beyond the first outer lateral edge of the membrane electrode assembly on a first lateral end of the membrane electrode assembly, and with the second lateral outer edge of the first gas diffusion layer being offset laterally beyond the second lateral outer edge of the membrane electrode assembly on a second lateral end of the membrane electrode assembly which is opposite the first lateral end,
the first gas diffusion layer has a longitudinal width in a longitudinal direction which is transverse to the lateral direction, the longitudinal width of the first gas diffusion layer being defined between third and fourth lateral outer edges of the first gas diffusion layer,
the membrane electrode assembly has a longitudinal width in the longitudinal direction which is transverse to the lateral direction, the longitudinal width of the membrane electrode assembly defined between third and fourth lateral outer edges of the membrane electrode assembly,
the longitudinal width of the membrane electrode assembly is greater than the longitudinal width of the first gas diffusion layer, with each of the third and fourth lateral outer edges of the membrane electrode assembly being offset beyond a respective one of the third and fourth lateral outer edges of the first gas diffusion layer in the longitudinal direction,
the lateral width of the membrane electrode assembly is greater than the lateral width of the second gas diffusion layer, with the first lateral outer edge of the membrane electrode assembly on the first lateral end of the membrane electrode assembly being laterally offset beyond the first lateral outer edge of the second gas diffusion layer in the lateral direction, and with the second lateral outer edge of the membrane electrode assembly on the second lateral end of the membrane electrode assembly being laterally offset beyond the second lateral outer edge of the second gas diffusion layer in the lateral direction, and
the seal extends between the first surface of the first gas diffusion layer and the second surface of the second gas diffusion layer, the seal having a first surface which is substantially coplanar with the first surface of the first gas diffusion layer and a second surface which is substantially coplanar with the second surface of the second gas diffusion layer.

10. The fuel cell stack arrangement of claim 9, wherein the membrane electrode assembly comprises a polymer electrolyte membrane.

11. The fuel cell stack arrangement of claim 9, wherein the second gas diffusion layer has a longitudinal width in the longitudinal direction which is transverse to the lateral direction, the longitudinal width of the second gas diffusion layer being defined by third and fourth lateral outer edges of the second gas diffusion layer, with each of the third and fourth lateral outer edges of the second gas diffusion layer being offset beyond a respective one of the third and fourth lateral outer edges of the first gas diffusion layer in the longitudinal direction.

12. The fuel cell stack arrangement of claim 9, including a frame mounted about a periphery of the membrane electrode assembly, the frame configured to restrict flow through the first lateral outer edge of the membrane electrode assembly.

13. A method of sealing a fuel cell interface, comprising:
limiting flow of a fuel cell fluid using a seal configured to restrict flow through:
a first outwardly facing edge of a first gas diffusion layer and a second outwardly facing edge of the first gas diffusion layer which is opposite the first outwardly facing edge with respect to a lateral direction, each of the first and second outwardly facing edges of the first gas diffusion layer extending between a first surface and a second surface of the first gas diffusion layer opposite the first surface and defining a lateral width of the first gas diffusion layer,
a first outwardly facing edge of a second gas diffusion layer and a second outwardly facing edge of the second gas diffusion layer which is opposite the first outwardly facing edge of the second gas diffusion layer with respect to the lateral direction, each of the first and second outwardly facing edges of the second gas diffusion layer extending between a first surface and a second surface of the second gas diffusion layer opposite the second surface and defining a lateral width of the second gas diffusion layer, and a first outwardly facing edge of a membrane electrode assembly and a second outwardly facing edge of the membrane electrode assembly which is opposite the first outwardly facing edge with respect to the lateral direction, the first and second outwardly facing edges of the membrane electrode assembly extending between a first surface and a second surface of the membrane electrode assembly opposite the first surface and defining a lateral width of the membrane electrode assembly, wherein:
  the lateral width of the first gas diffusion layer is greater than the lateral width of the membrane electrode assembly, with the first outwardly facing edge of the first gas diffusion layer being offset laterally beyond the first outwardly facing edge of the membrane electrode assembly on a first lateral end of the membrane electrode assembly, and with the second outwardly facing edge of the first gas diffusion layer being offset laterally beyond the second outwardly facing edge of the membrane electrode assembly on a second lateral end of the membrane electrode assembly which is opposite the first lateral end,
  the first gas diffusion layer has a longitudinal width in a longitudinal direction which is transverse to the lateral direction, the longitudinal width of the first gas diffusion layer being defined between third and fourth outwardly facing edges of the first gas diffusion layer,
  the membrane electrode assembly has a longitudinal width in the longitudinal direction which is transverse to the lateral direction, the longitudinal width of the membrane electrode assembly defined between third and fourth outwardly facing edges of the membrane electrode assembly,
  the longitudinal width of the membrane electrode assembly is greater than the longitudinal width of the first gas diffusion layer, with each of the third and fourth outwardly facing edges of the membrane electrode assembly being offset beyond a respective one of the third and fourth outwardly facing edges of the first gas diffusion layer in the longitudinal direction,
  the lateral width of the membrane electrode assembly is greater than the lateral width of the second gas diffusion layer, with the first outwardly facing edge of the membrane electrode assembly on the first lateral end of the membrane electrode assembly being laterally offset beyond the first outwardly facing edge of the second gas diffusion layer in the lateral direction, and with the second outwardly facing edge of the membrane electrode assembly on the second lateral end of the membrane electrode assembly being laterally offset beyond the second outwardly facing edge of the second gas diffusion layer in the lateral direction,
  the limiting including:
  completely covering the first outwardly facing edge of the first gas diffusion layer, the first outwardly facing edge of the second gas diffusion layer, and the first outwardly facing edge of the membrane electrode assembly with the seal, the seal extending between the first surface of the first gas diffusion layer and the second surface of the second gas diffusion layer, the seal having a first surface which is substantially coplanar with the first surface of the first gas diffusion layer and a second surface which is substantially coplanar with the second surface of the second gas diffusion layer.

14. The method of claim 13, further comprising impregnating a portion of the first gas diffusion layer and a portion of the second gas diffusion layer with a portion of the seal.

15. The fuel cell seal assembly of claim 1, wherein the second gas diffusion layer has a longitudinal width in the longitudinal direction which is transverse to the lateral direction, the longitudinal width of the second gas diffusion layer defined by third and fourth outer lateral edges of the second gas diffusion layer, with each of the third and fourth outer lateral edges being offset beyond a respective one of the third and fourth outer lateral edges of the membrane electrode assembly in the longitudinal direction which is transverse to the lateral direction.

* * * * *